United States Patent
Tsai et al.

(10) Patent No.: US 12,022,510 B2
(45) Date of Patent: *Jun. 25, 2024

(54) UPLINK DESIGNS FOR NEW RADIO UNLICENSED SPECTRUM

(71) Applicant: MediaTek Inc., Hsinchu (TW)

(72) Inventors: Chiou-Wei Tsai, Hsinchu (TW); Chun-Hsuan Kuo, Hsinchu (TW)

(73) Assignee: MediaTek Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,923

(22) Filed: Apr. 25, 2023

(65) Prior Publication Data
US 2023/0262762 A1    Aug. 17, 2023

Related U.S. Application Data

(63) Continuation of application No. 16/586,267, filed on Sep. 27, 2019, now Pat. No. 11,641,668.

(60) Provisional application No. 62/738,045, filed on Sep. 28, 2018.

(51) Int. Cl.
*H04W 74/08* (2024.01)
*H04W 72/0446* (2023.01)
*H04W 72/1268* (2023.01)
*H04W 74/0808* (2024.01)
*H04W 74/0833* (2024.01)

(52) U.S. Cl.
CPC ... *H04W 74/0808* (2013.01); *H04W 72/0446* (2013.01); *H04W 72/1268* (2013.01); *H04W 74/0833* (2013.01)

(58) Field of Classification Search
CPC ......... H04W 72/0446; H04W 72/1268; H04W 74/0808; H04W 74/0833
See application file for complete search history.

(56) References Cited

U.S. PATENT DOCUMENTS

| | | |
|---|---|---|
| 2016/0100398 A1 | 4/2016 | Xia et al. |
| 2016/0143014 A1 | 5/2016 | Mukherjee et al. |
| 2016/0345206 A1 | 11/2016 | Yerramalli et al. |

(Continued)

FOREIGN PATENT DOCUMENTS

| | | |
|---|---|---|
| CA | 2997465 A1 | 3/2017 |
| CN | 103181113 A | 6/2013 |

(Continued)

OTHER PUBLICATIONS

China National Intellectual Property Administration, Office Action for China Patent Application No. 201980003729.5, dated Jul. 30, 2021.

(Continued)

*Primary Examiner* — Derrick V Rose
(74) *Attorney, Agent, or Firm* — Han IP PLLC; Andy M. Han

(57) ABSTRACT

Various examples and schemes pertaining to uplink (UL) designs for New Radio (NR) unlicensed spectrum (NR-U) operation in mobile communications are described. An apparatus as a user equipment (UE) receives, from a network node, a scheduling of a plurality of starting slots for an UL transmission by the apparatus. The apparatus performs a listen-before-talk (LBT) procedure and, based on a result of the LBT procedure, the apparatus performs the UL transmission with an initial slot of the UL transmission in one of the plurality of starting slots.

15 Claims, 9 Drawing Sheets

(56) References Cited

U.S. PATENT DOCUMENTS

| | | |
|---|---|---|
| 2017/0332410 A1 | 11/2017 | Babaei et al. |
| 2019/0289635 A1 | 9/2019 | Wang et al. |
| 2020/0344100 A1 | 10/2020 | Matsumura et al. |
| 2021/0274555 A1 | 9/2021 | Alfarhan et al. |
| 2021/0345407 A1 | 11/2021 | Myung et al. |

FOREIGN PATENT DOCUMENTS

| | | |
|---|---|---|
| CN | 105611637 A | 5/2016 |
| CN | 106792779 A | 5/2017 |
| CN | 107371274 A | 11/2017 |
| CN | 107872860 A | 4/2018 |
| CN | 108029023 A | 5/2018 |
| EP | 3352522 A1 | 7/2018 |

OTHER PUBLICATIONS

Taiwan Intellectual Property Office, Office Action for Taiwan Patent Application No. 108135284, dated Aug. 17, 2020.
China National Intellectual Property Administration, International Search Report and Written Opinion for PCT/CN2019/108827, dated Dec. 20, 2019.

(A)
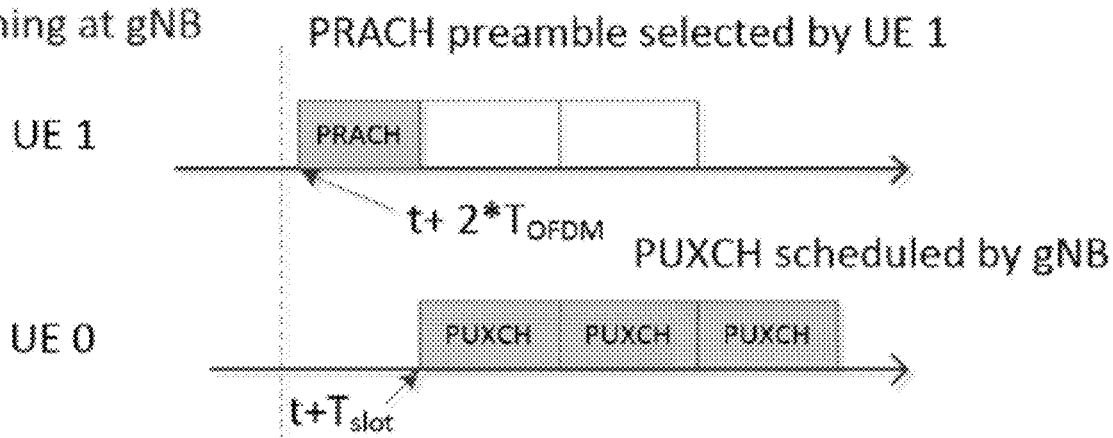
(B)
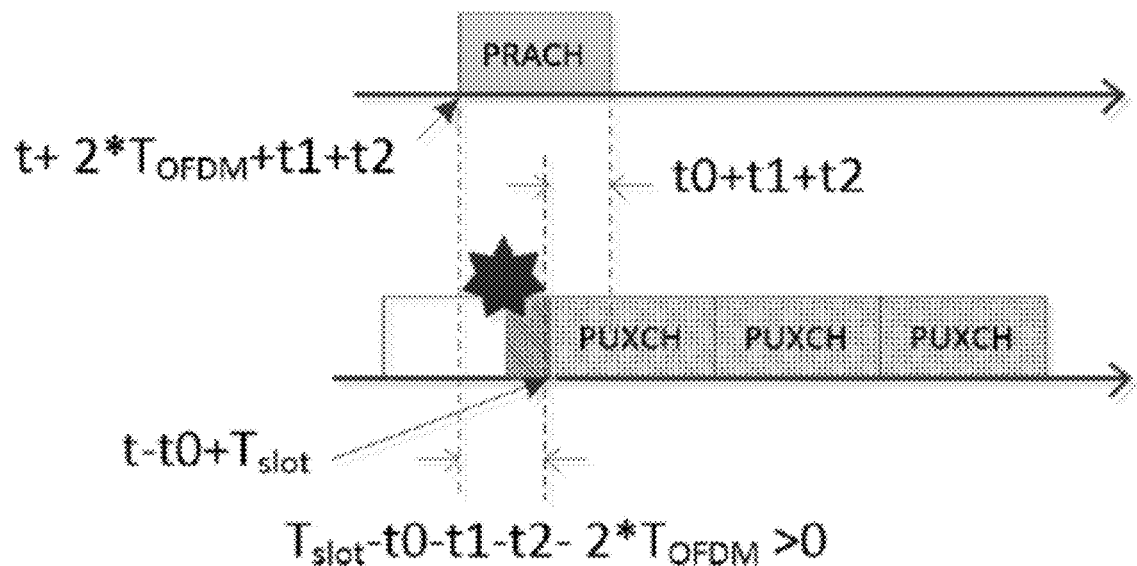
FIG. 7

(A)
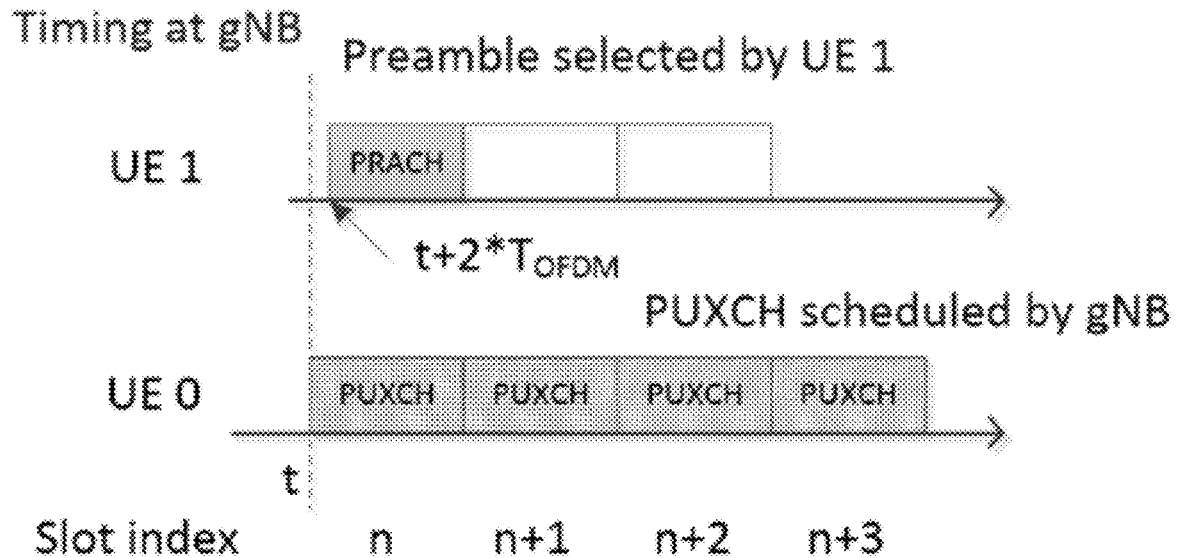
(B)
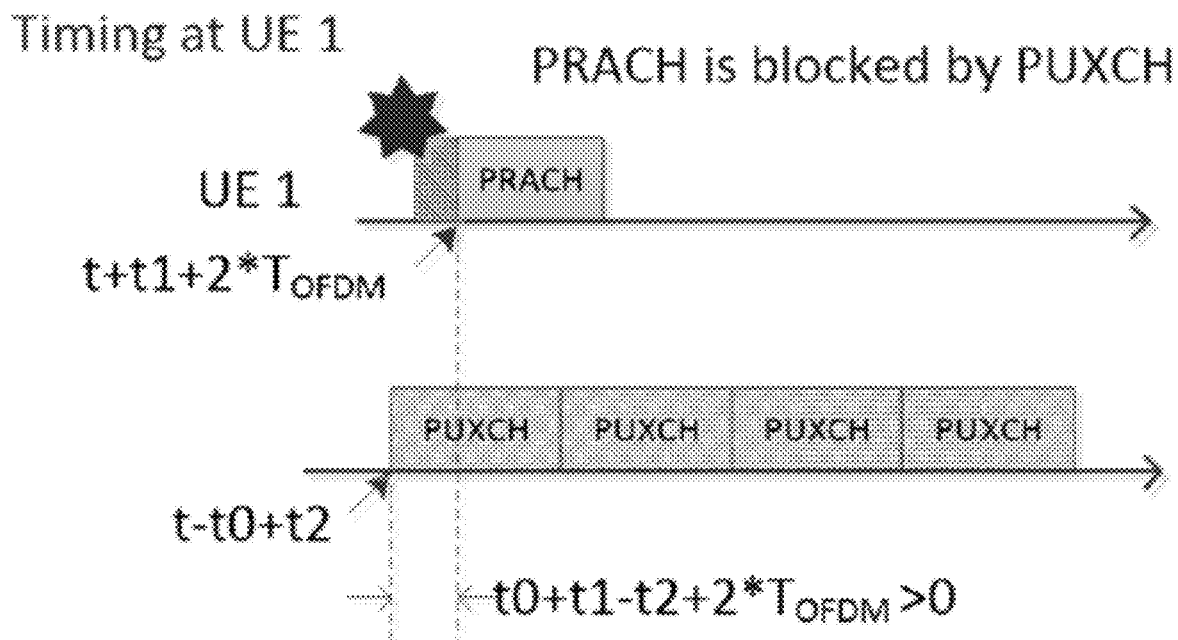
FIG. 8

(A)
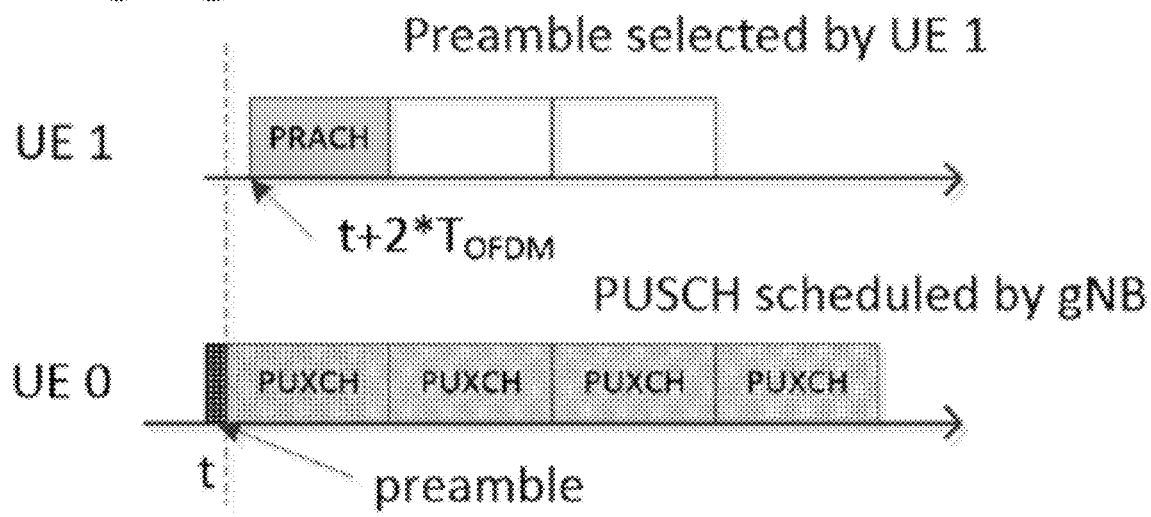
(B)
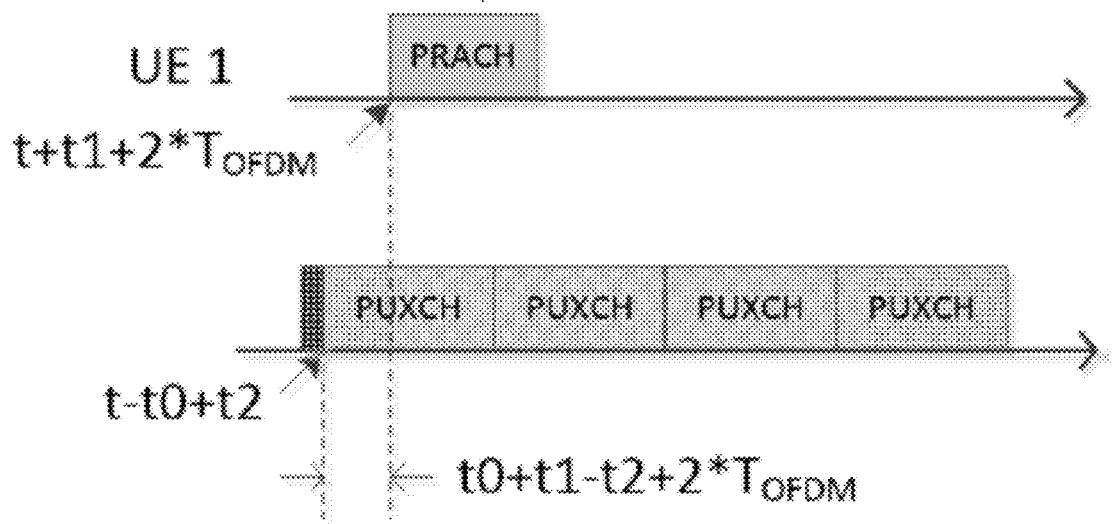
FIG. 9

UPLINK DESIGNS FOR NEW RADIO UNLICENSED SPECTRUM

CROSS REFERENCE TO RELATED PATENT APPLICATION(S)

The present disclosure is a Continuation of U.S. patent application Ser. No. 16/586,267, filed on 27 Sep. 2019 and claiming the priority benefit of U.S. Patent Application No. 62/738,045, filed on 28 Sep. 2018. Contents of aforementioned applications are incorporated by reference in their entirety.

TECHNICAL FIELD

The present disclosure is generally related to wireless communications and, more particularly, to uplink (UL) designs for New Radio (NR) unlicensed spectrum (NR-U) operation in mobile communications.

BACKGROUND

Unless otherwise indicated herein, approaches described in this section are not prior art to the claims listed below and are not admitted as prior art by inclusion in this section.

Under the $3^{rd}$ Generation Partnership Project (3GPP) specifications, physical random access channel (PRACH) transmission by a user equipment (UE) is necessary for standalone NR-U operation. The transmission of physical uplink control channel (PUCCH) and physical uplink shared channel (PUSCH) should not block the transmission of a PRACH preamble. However, in situations in which a first UE is to perform a PUSCH or PUCCH transmission to a network node (e.g., gNB) of a mobile network when a second UE is to transmit a PRACH preamble to the network node, there may be an issue with the transmission of the PUSCH/PUCCH by the first UE blocking the transmission of PRACH by the second UE, and vice versa, when propagation delays between the first UE and the second UE and between the second UE and the network node are unknown to the network node. Therefore, there is a need for a solution to address this issue for NR-U operation.

Additionally, under current 3GPP specification, the payload size of NR PUCCH format 0/1 tends to be small (with only one or two bits), and NR PUCCH format 0/1/4 occupies merely one physical resource block (PRB). Moreover, the multiplexing capacity of NR PUCCH format 2/3 is merely 1 (i.e., only one PUCCH on the same resource). Thus, the resource mapping needs to be modified to allow for a more efficient way for uplink control information (UCI) transmission.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus receiving from a network node a scheduling of a plurality of starting slots for an UL transmission by the apparatus. The method may also involve the processor performing a listen-before-talk (LBT) procedure. The method may further involve the processor performing the UL transmission with an initial slot of the UL transmission in one of the plurality of starting slots based on a result of the LBT procedure.

In one aspect, a method may involve a processor of an apparatus detecting an existence of any preamble transmitted by another apparatus. Based on a result of the detecting, the method may involve the processor performing an LBT procedure followed by an UL transmission responsive to a preamble transmitted by one other apparatus being detected. Alternatively, based on the result of the detecting, the method may involve the processor performing the UL transmission without first performing the LBT procedure responsive to no preamble being detected.

It is noteworthy that, although description provided herein may be in the context of certain radio access technologies, networks and network topologies such as NR, the proposed concepts, schemes and any variation(s)/derivative(s) thereof may be implemented in, for and by other types of radio access technologies, networks and network topologies such as, for example and without limitation, $5^{th}$ Generation (5G), Long-Term Evolution (LTE), LTE-Advanced, LTE-Advanced Pro and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 7 is a diagram of an example scenario of PUSCH being blocked by PRACH.

FIG. 8 is a diagram of an example scenario of PRACH being blocked by PUSCH.

FIG. 9 is a diagram of an example scenario of PRACH being not blocked by PUSCH in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UL designs for NR-U operation in mobile communications. According to the present disclosure, a number of possible solutions may be implemented separately or jointly. That is, although these possible solutions may be described below separately, two or more of these possible solutions may be implemented in one combination or another.

Figure 1:
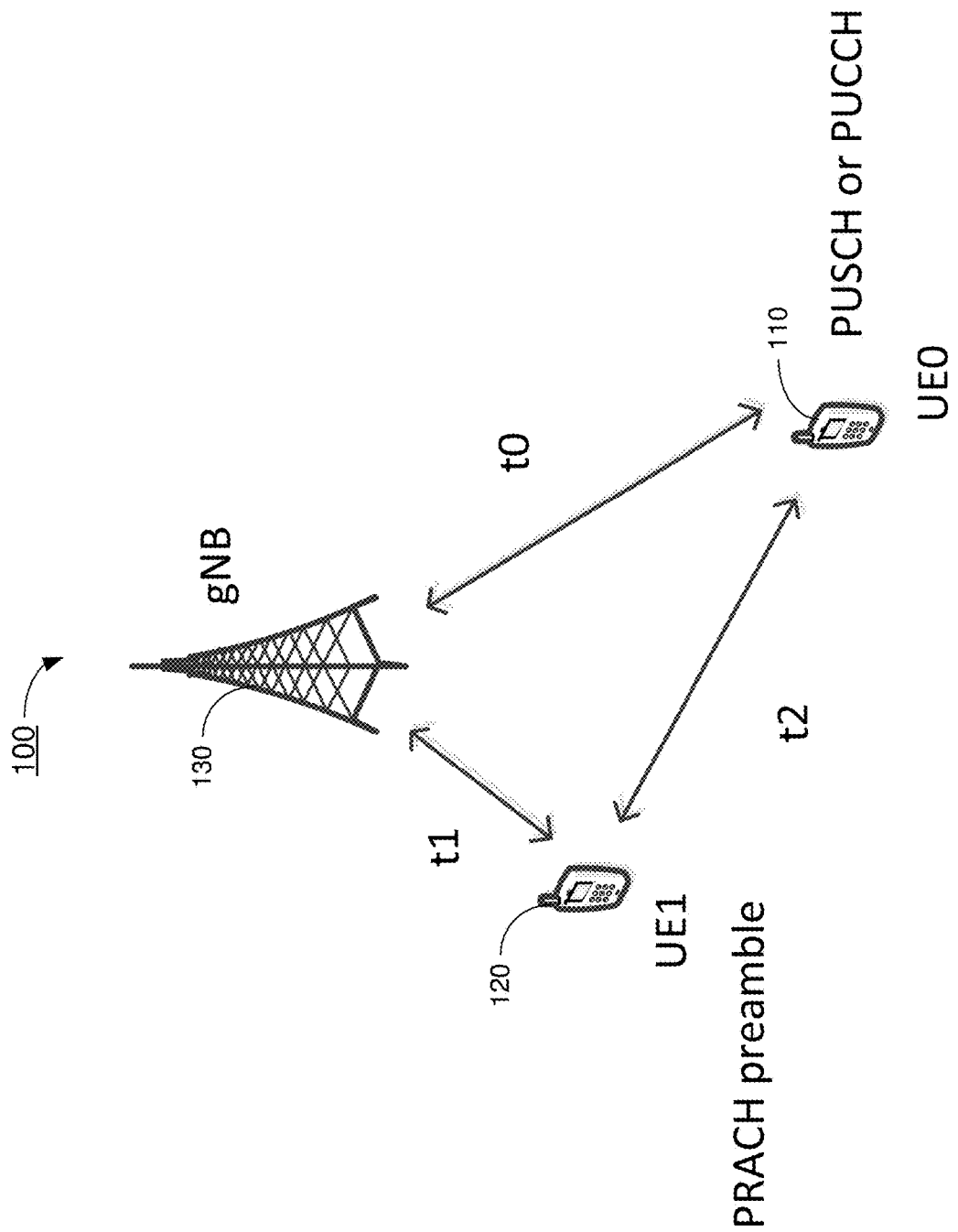
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. The following description of various proposed schemes is provided with reference to FIG. 1.

Referring to FIG. 1, network environment 100 may involve a first UE 110 (denoted as "UE0" in FIG. 1), a second UE 120 (denoted as "UE1" in FIG. 1), and a network node 130 (denoted as "gNB" in FIG. 1, although network node 130 may also be an eNB or a transmit/receive point (TRP)) of a wireless network (e.g., 5G/NR mobile network). In network environment 100, each of first UE 110 and second UE 120 may be configured to implement various schemes pertaining to UL designs for NR-U operation in mobile communications in accordance with the present disclosure, as described below.

For better appreciation of advantages and benefits provided by various proposed schemes in accordance with the present disclosure, considering first a case with the following assumptions with respect to network environment 100: (1) time $t_0$ is the propagation delay between first UE 110 and network node 130; (2) time $t_1$ is the propagation delay between second UE 120 and network node 130; (3) time $t_2$ is the propagation delay between first UE 110 and second UE 120; (4) $t_0$ is known to network node 130 but $t_0$ and $t_2$ are unknown to network node 130; (5) first UE 110 has PUSCH or PUCCH to be transmitted; and (6) second UE 120 has PRACH preamble to be transmitted, with the PRACH preamble occupying twelve orthogonal frequency-division multiplexing (OFDM) symbols (15 kHz) and starting from second OFDM symbols. However, due to the unknown propagation delays $t_1$ and $t_2$, the transmission of PUSCH/PUCCH by first UE 110 may block the transmission of PRACH by second UE 120, and vice versa. For illustration, FIG. 7 illustrates an example scenario 700 of PUSCH being blocked by PRACH, and FIG. 8 illustrates an example scenario 800 of PRACH being blocked by PUSCH.

Part (A) of FIG. 7 shows the timing at network node 130 (denoted as "gNB") and part (B) of FIG. 7 shows the timing at first UE 110 (denoted as "UE0"). Referring to FIG. 7, in this example, it is assumed that second UE 120 chooses the random access channel (RACH) resource in slot n to transmit a PRACH preamble, and network node 130 schedules the PUSCH/PUCCH (denoted as "PUXCH" in FIG. 7) of first UE 110 from slot n+1 to slot n+3. To align the timing at network node 130, first UE 110 will start the transmission of PUSCH/PUCCH at time $t+T_{slot}-t_0$, with $T_{slot}$ being the slot duration. As second UE 120 does not know its timing advance, transmission of the PRACH preamble is started from time $t+2*T_{OFDM}+t_1$, with $T_{OFDM}$ being an OFDM symbol time. Since PRACH is transmitted by second UE 120 before the scheduled PUSCH/PUCCH transmission, the transmission of PUSCH/PUCCH by first UE 110 is blocked by the PRACH.

Part (A) of FIG. 8 shows the timing at network node 130 (denoted as "gNB") and part (B) of FIG. 8 shows the timing at second UE 120 (denoted as "UE1"). Referring to FIG. 8, in this example, it is assumed that second UE 120 chooses the RACH resource in slot n to transmit a PRACH preamble, and network node 130 schedules the PUSCH/PUCCH (denoted as "PUXCH" in FIG. 8) of first UE 110 from slot n to slot n+3. To align the timing at network node 130, first UE 110 will start the transmission of PUSCH/PUCCH at time $t-t_0$. As second UE 120 does not know its timing advance, transmission of the PRACH preamble is started from time $t+2*T_{OFDM}+t_1$, with $T_{OFDM}$ being an OFDM symbol time. Since PUSCH/PUCCH is transmitted by first UE 110 before the scheduled PRACH transmission, the transmission of PRACH by second UE 120 is blocked by the PUSCH/PPUCCH.

To prevent the above-described situations from happening, various proposed schemes in accordance with the present disclosure may involve network node 130 configuring multiple starting transmission positions (or time slots) for PUSCH/PUCCH transmission and first UE 110 deciding in which of the multiple starting transmission positions (or time slots) to start the PUSCH/PUCCH transmission based on a result of LBT. Moreover, various proposed schemes in accordance with the present disclosure may involve first UE 110 using a preamble to inform other UEs (e.g., second UE 120) that the current PUSCH/PUCCH transmission is for the same cell/network node (e.g., network node 130) with which the other UEs are associated.

With respect to the issue of PUSCH/PUCCH transmission being blocked by PRACH transmission, it is plausible that there may be some gaps in the beginning of the PUSCH/PUCCH transmission, which may be achieved by scheduling from network node 130. However, this may lead to a waste of resources in an event that second UE 120 does not choose slot n to transmit the PRACH preamble. Thus, to achieve an efficient UL transmission, under a proposed scheme in accordance with the present disclosure, multiple starting positions (or time slots) may be configured by network node 130 for the transmission of a PUSCH/PUCCH burst. The starting position may be decided by first UE 110 based on results of an LBT procedure performed by first UE 110.

With respect to the issue of PRACH transmission being blocked by PUSCH/PUCCH transmission, under a proposed scheme in accordance with the present disclosure, the PUSCH/PUCCH transmission by first UE 110 may be preceded by a preamble for detection by second UE 120 so as to avoid the blocking issue. FIG. 9 illustrates an example scenario 900 of PRACH being not blocked by PUSCH in accordance with the proposed scheme. Part (A) of FIG. 9 shows the timing at network node 130 (denoted as "gNB") and part (B) of FIG. 9 shows the timing at second UE 120 (denoted as "UE1").

Under the proposed scheme, preamble may be cell-specific, and it may be configured by remaining minimum system information (RMSI) or radio resource control (RRC) signaling from network node 130. The preamble may indicate the duration of the PUSCH/PUCCH transmission and/or an identification (ID) of the serving cell for first UE 110 (e.g., an ID of a cell corresponding to network node 130). Accordingly, second UE 120 may detect the existence of the preamble before transmitting a PRACH preamble and, thus, the PRACH would not be blocked due to the preamble transmitted by first UE 110 being detected by second UE 120. In an event that second UE 120 detects the preamble transmitted by first UE 110 and that second UE 120 determines that the detected preamble belongs to the serving cell of second UE 120 while the intended PRACH transmission is at least partially inside the duration of the PUSCH/PUCCH transmission by first UE 110 as indicated by the detected preamble, second UE 120 may take either of two options. Under a first option, second UE 120 may assume that the communication channel is idle (which is equivalent to success of LBT) and thus may proceed with the PRACH transmission. The assumption here is that network node 130 may have scheduled first UE 110 and second UE 120 to transmit in different frequencies although in time domain there may be an overlap. Under a second option, second UE 120 may perform an LBT procedure before the transmission of its PRACH preamble and, upon a successful LBT (e.g., no transmission by first UE 110 or any other UE being detected), proceed with the PRACH transmission.

Given the uncertainty of LBT and the regulatory requirement on occupied channel bandwidth (OCB), it may be beneficial to take UE multiplexing capacity into the PUCCH design consideration. To overcome the uncertainty of LBT and improve spectral efficiency in the unlicensed band, a network may schedule UL transmission of multiple UEs within the same channel occupancy time. However, due to the OCB requirement, the number of interlaces per symbol is limited. Thus, multiplexing more than one PUCCH in the same resource may be necessary.

Under a proposed scheme in accordance with the present disclosure, NR PUCCH format 2 and format 3 may be modified to support UE multiplexing. For instance, when performing a PUCCH transmission, a UE (e.g., first UE 110) may perform the PUCCH transmission with orthogonal covering code (OCC) applied to a PUCCH format to support multiplexing. For instance, first UE 110 may perform the PUCCH transmission with the OCC applied to PUCCH format 2 or format 3 to support multiplexing by code-division multiplexing (CDM). The length of the OCC may be 2 or 4. To help better appreciate advantages and benefits provided by the proposed scheme, FIG. 2 illustrates an example scenario 200 in accordance with an implementation of the present disclosure, and FIG. 3 illustrates an example scenario 300 in accordance with an implementation of the present disclosure.

Figure 2:
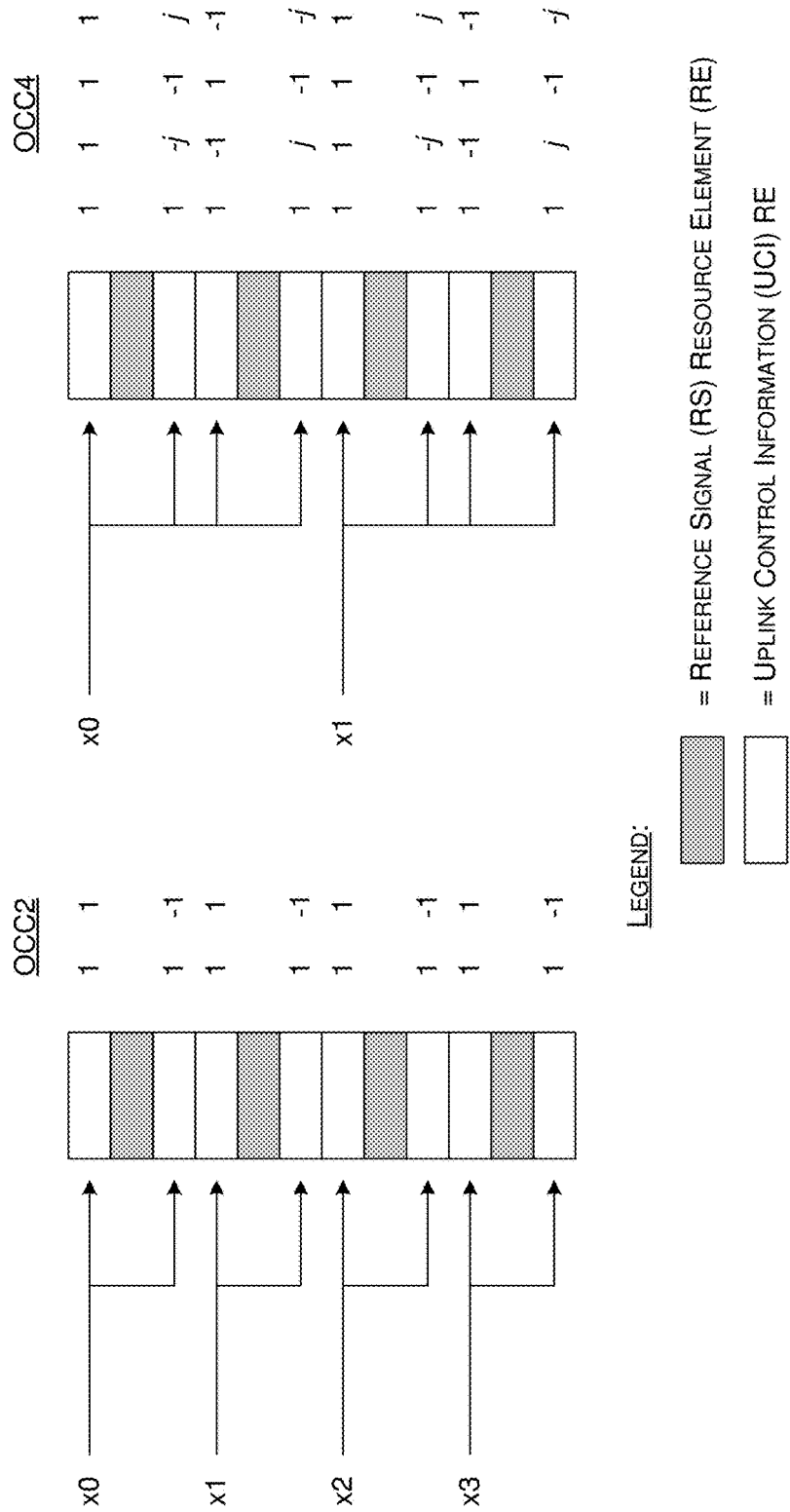
FIG. 2 is a diagram of an example scenario in accordance with an implementation of the present disclosure.

Referring to FIG. 2, scenario 200 may involve modified PUCCH format 2 (short PUCCH) with CDM 2/4. For CDM 2, for the data to be transmitted, the transmitting UE may apply the following OCCs: {1 1 1 1 1 1 1 1 1} and {1–1 1–1 1–1 1–1}. For CDM 2, the transmitting UE may transmit two orthogonal reference signal (RS) sequences, with the length of the sequences depending on the bandwidth. For CDM 4, for the data to be transmitted, the transmitting UE may apply the following OCCs: {1 1 1 1 1 1 1 1 1}, {1 –j –1 j 1 –j –1 j}, {1–1 1 –1 1–1 1–1}, and {1 j –1 –j 1 j –1 –j}. For CDM 4, the transmitting UE may transmit four orthogonal RS sequences, with the length of the sequences depending on the bandwidth.

Figure 3:
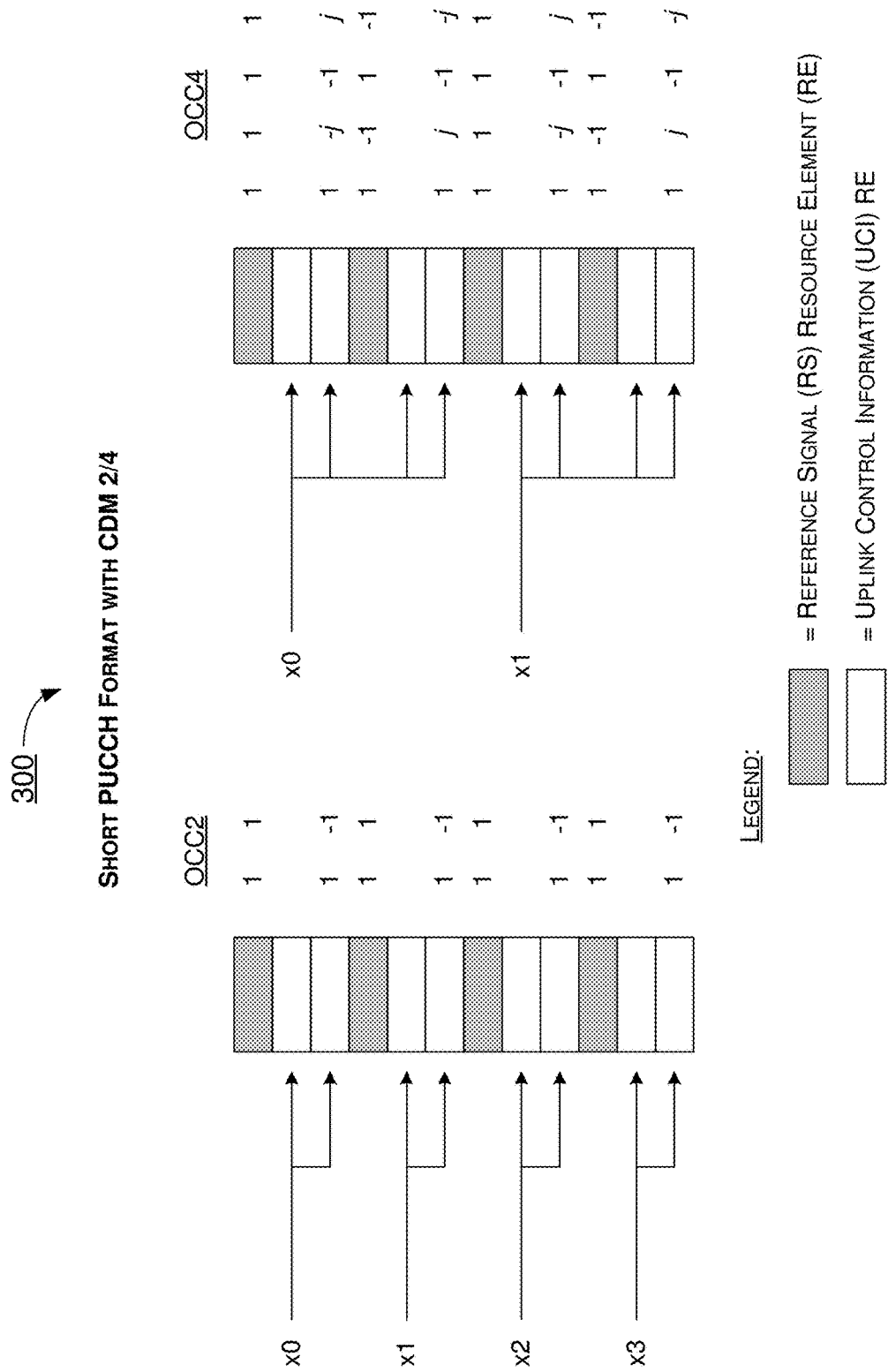
FIG. 3 is a diagram of an example scenario in accordance with an implementation of the present disclosure.

Referring to FIG. 3, scenario 300 may involve modified PUCCH format 2 (short PUCCH) with CDM 2/4. Different from scenario 200, in scenario 300 the RS is located at {0, 3, 6, 9}. Other than that, description above with respect to scenario 200 also applies to scenario 300.

Illustrative Implementations

Figure 4:
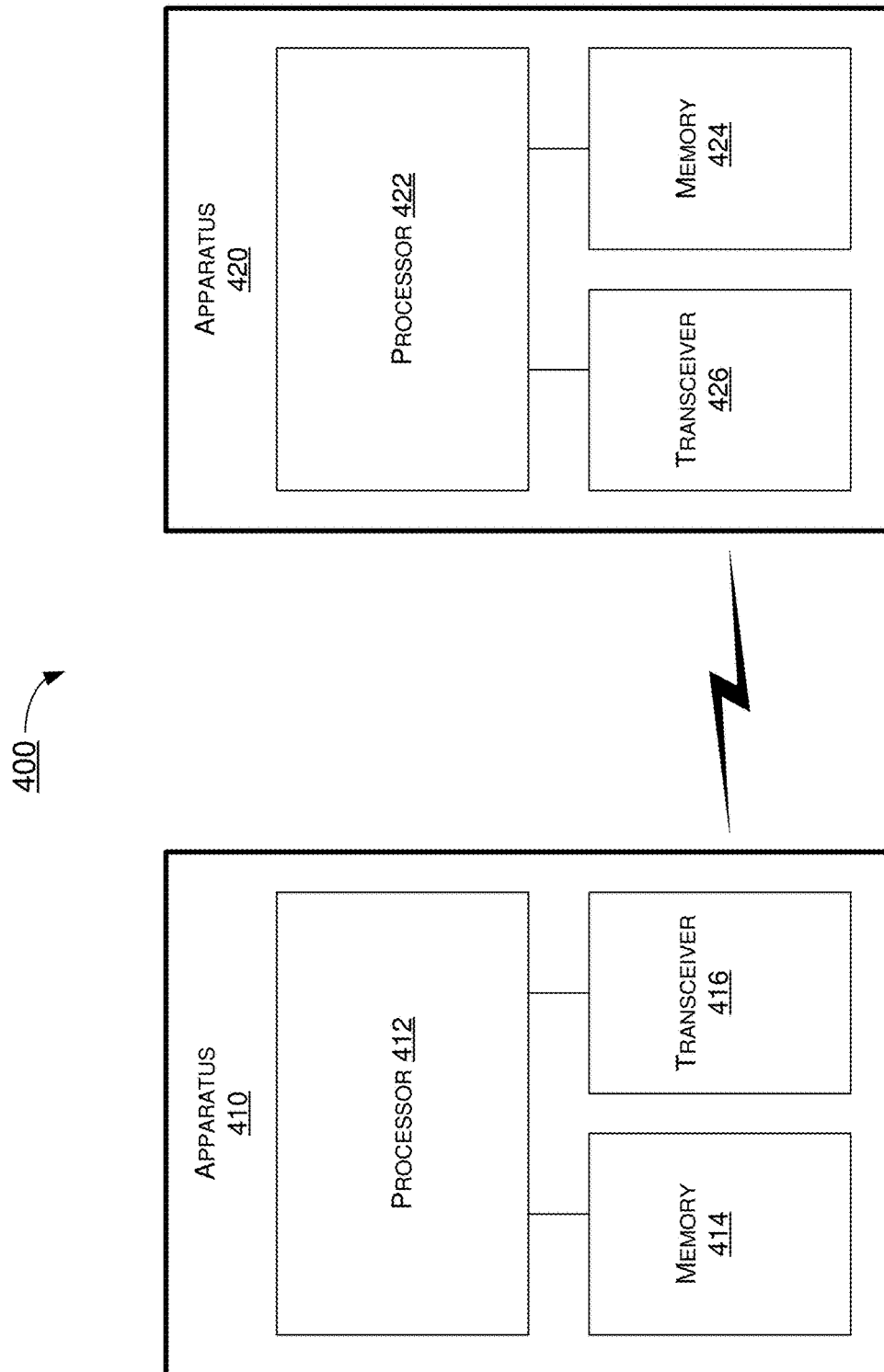
FIG. 4 is a block diagram of an example communication environment in accordance with an implementation of the present disclosure.

FIG. 4 illustrates an example communication environment 400 having an example apparatus 410 and an example apparatus 420 in accordance with an implementation of the present disclosure. Each of apparatus 410 and apparatus 420 may perform various functions to implement schemes, techniques, processes and methods described herein pertaining to UL designs for NR-U operation in mobile communications, including various schemes described above as well as processes 500 and 600 described below.

Each of apparatus 410 and apparatus 420 may be a part of an electronic apparatus, which may be a UE such as a vehicle, a portable or mobile apparatus, a wearable apparatus, a wireless communication apparatus or a computing apparatus. For instance, each of apparatus 410 and apparatus 420 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 410 and apparatus 420 may also be a part of a machine type apparatus, which may be an IoT or NB-IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. Alternatively, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. Each of apparatus 410 and apparatus 420 may include at least some of those components shown in FIG. 4 such as a processor 412 and a processor 422, respectively. Each of apparatus 410 and apparatus 420 may further include one or more other components not pertinent to the proposed scheme of the present disclosure (e.g., internal power supply, display device and/or user interface device), and, thus, such component(s) of each of apparatus 410 and apparatus 420 are neither shown in FIG. 4 nor described below in the interest of simplicity and brevity.

In some implementations, at least one of apparatus 410 and apparatus 420 may be a part of an electronic apparatus, which may be a vehicle, a roadside unit (RSU), network node or base station (e.g., eNB, gNB or TRP), a small cell, a router or a gateway. For instance, at least one of apparatus 410 and apparatus 420 may be implemented in a vehicle in a vehicle-to-vehicle (V2V) or vehicle-to-everything (V2X) network, an eNodeB in an LTE, LTE-Advanced or LTE-Advanced Pro network or in a gNB in a 5G, NR, IoT or NB-IoT network. Alternatively, at least one of apparatus 410 and apparatus 420 may be implemented in the form of one or more IC chips such as, for example and without limitation, one or more single-core processors, one or more multi-core processors, or one or more CISC processors.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including UL designs for NR-U operation in mobile communications in accordance with various implementations of the present disclosure.

In some implementations, apparatus 410 may also include a transceiver 416, as a communication device, coupled to processor 412 and capable of wirelessly transmitting and receiving data. In some implementations, apparatus 410 may further include a memory 414 coupled to processor 412 and capable of being accessed by processor 412 and storing data therein. In some implementations, apparatus 420 may also include a transceiver 426, as a communication device, coupled to processor 422 and capable of wirelessly transmitting and receiving data. In some implementations, apparatus 420 may further include a memory 424 coupled to processor 422 and capable of being accessed by processor 422 and storing data therein. Accordingly, apparatus 410 and apparatus 420 may wirelessly communicate with each other via transceiver 416 and transceiver 426, respectively.

To aid better understanding, the following description of the operations, functionalities and capabilities of each of apparatus 410 and apparatus 420 is provided in the context of a NR communication environment in which apparatus 410 is implemented in or as a wireless communication device, a communication apparatus or a UE (e.g., first UE 110) and apparatus 420 is implemented in or as a wireless communication device, a communication apparatus or another UE (e.g., second UE 120) in a network environment (e.g., network environment 100).

In one aspect of UL designs for NR-U operation in mobile communications in accordance with the present disclosure, processor 412 of apparatus 410 (as first UE 110) may receive, via transceiver 416, from a network node (e.g., network node 130) a scheduling of a plurality of starting slots for an UL transmission by apparatus 410. Additionally, processor 412 may perform, via transceiver 416, a listen-before-talk (LBT) procedure. Moreover, processor 412 may perform, via transceiver 416, the UL transmission with an initial slot of the UL transmission in one of the plurality of starting slots based on a result of the LBT procedure.

In some implementations, in performing the UL transmission with the initial slot of the UL transmission in one of the plurality of starting slots based on the result of the LBT procedure, processor 412 may perform certain operations. For instance, processor 412 may select a first starting slot of the plurality of starting slots to begin the UL transmission responsive to the result of the LBT procedure indicating no other transmission in the first starting slot. Moreover, processor 412 may select a second starting slot of the plurality of starting slots after the first starting slot to begin the UL transmission responsive to the result of the LBT procedure indicating at least one other transmission in the first starting slot.

In some implementations, the at least one other transmission may include a PRACH transmission by another apparatus (e.g., apparatus 420).

In some implementations, in performing the UL transmission, processor 412 may perform the UL transmission with an initial slot of the UL transmission preceded by a preamble. In some implementations, the preamble may be cell-specific with respect to a cell with which apparatus 410 is associated. In some implementations, the preamble may be configured by RMSI or RRC signaling from the network node. In some implementations, the preamble may indicate a duration of the UL transmission. Alternatively, or additionally, the preamble may indicate an identification of a serving cell.

In some implementations, in performing the LBT procedure, processor 412 may perform certain operations. For instance, processor 412 may detect an existence of any preamble before performing the UL transmission. Based on a result of the detecting, processor 412 may perform the LBT procedure before the UL transmission in response to a preamble transmitted by one other apparatus being detected. Alternatively, processor 412 may skip the LBT procedure before the UL transmission in response to no preamble being detected. In some implementations, the UL transmission may include a PRACH transmission, a PUSCH transmission, a PUCCH transmission, or a sounding reference signal (SRS) transmission.

In some implementations, in performing the LBT procedure, processor 412 may perform the LBT procedure based on the preamble transmitted by one other apparatus being detected plus on one or more of: (a) the detected preamble belonging to a same serving cell with which the apparatus is associated; and (b) the UL transmission being within a duration of one other UL transmission by the other apparatus as indicated in the preamble. In some implementations, the UL transmission may include a PRACH transmission. In such cases, the other UL transmission may include a PUSCH transmission, a PUCCH transmission, or an SRS transmission.

In some implementations, in performing the UL transmission, processor 412 may perform a PUCCH transmission with OCC applied to a PUCCH format to support multiplexing. In some implementations, in performing the PUCCH transmission with the OCC applied to the PUCCH format to support multiplexing, processor 412 may perform the PUCCH transmission with the OCC applied to PUCCH format 2 or format 3 to support multiplexing by CDM. In some implementations, a length of the OCC may be 2 or 4.

In another aspect of UL designs for NR-U operation in mobile communications in accordance with the present disclosure, processor 422 of apparatus 420 (as second UE 120) may detect, via transceiver 426, an existence of any preamble transmitted by another apparatus (e.g., apparatus 410). Based on a result of the detecting, processor 422 may perform different operations. For instance, processor 422 may perform, via transceiver 426, an LBT procedure followed by an UL transmission in response to a preamble transmitted by one other apparatus (e.g., apparatus 410) being detected. Alternatively, processor 422 may perform, via transceiver 426, the UL transmission without first performing the LBT procedure in response to no preamble being detected.

In some implementations, the UL transmission may include a PRACH transmission. In such cases, the other UL transmission may include a PUSCH transmission, a PUCCH transmission, or an SRS transmission.

In some implementations, in performing the LBT procedure processor 422 may perform the LBT procedure based on the preamble transmitted by one other apparatus being detected plus on one or more of: (a) the detected preamble belonging to a same serving cell with which the apparatus is associated; and (b) the UL transmission being within a duration of one other UL transmission by the other apparatus as indicated in the preamble. In such cases, the UL transmission may include a PRACH transmission, and the other UL transmission may include a PUSCH transmission, a PUCCH transmission, or an SRS transmission.

In some implementations, in performing the UL transmission, processor 422 may perform a PUCCH transmission with OCC applied to a PUCCH format to support multiplexing. In some implementations, in performing the PUCCH transmission with the OCC applied to the PUCCH format to support multiplexing, processor 422 may perform the PUCCH transmission with the OCC applied to PUCCH format 2 or format 3 to support multiplexing by CDM. In such cases, a length of the OCC may be 2 or 4.

Illustrative Processes

Figure 5:
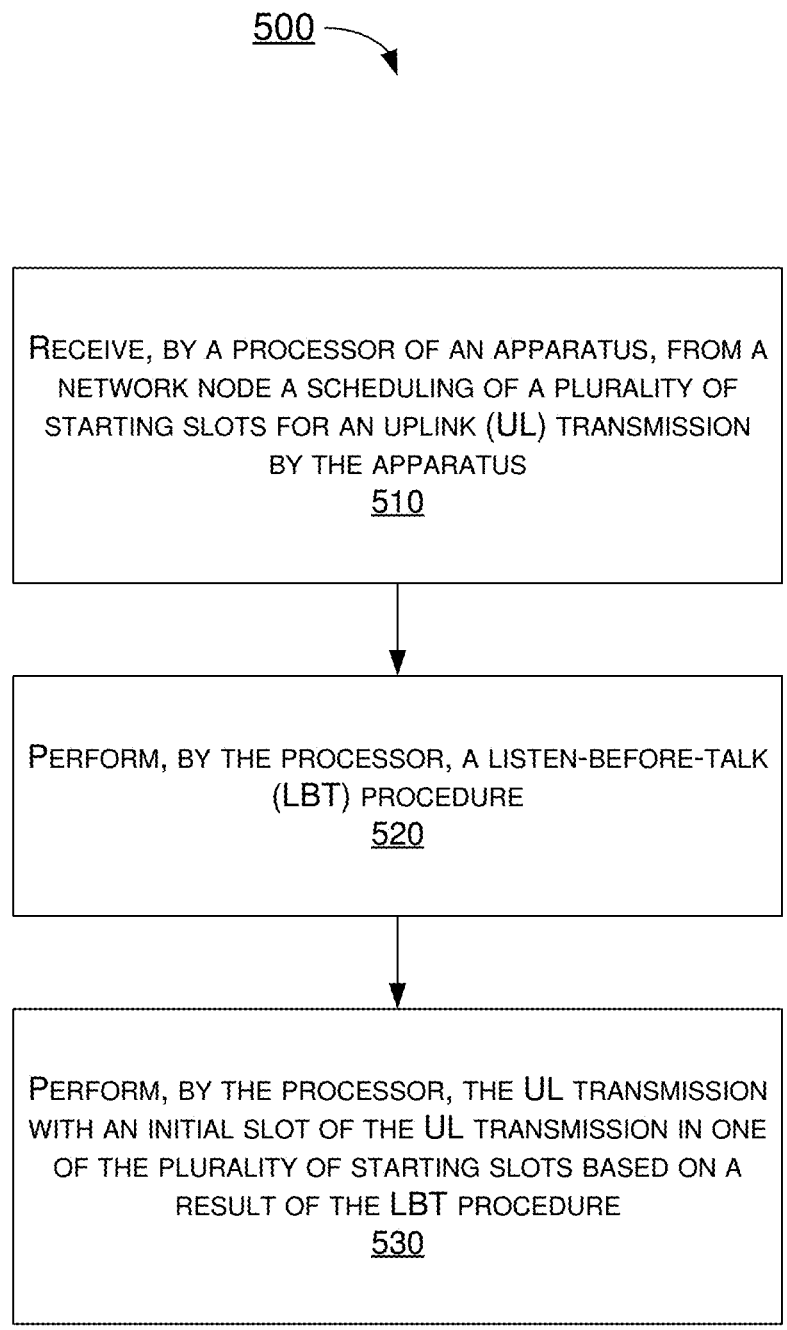
FIG. 5 is a flowchart of an example process in accordance with an implementation of the present disclosure.

FIG. 5 illustrates an example process 500 in accordance with an implementation of the present disclosure. Process 500 may be an example implementation of the proposed schemes described above with respect to UL designs for NR-U operation in mobile communications in accordance with the present disclosure. Process 500 may represent an aspect of implementation of features of apparatus 410 and apparatus 420. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 410, apparatus 420 and/or any suitable wireless communication device, UE, roadside unit (RUS), base station or machine type devices. Solely for illustrative purposes and without limitation, process 500 is described below in the context of apparatus 410 as one UE (e.g., first UE 110) and apparatus 420 as another UE (e.g., second UE 120) in a network environment (e.g., network environment 100). Process 500 may begin at block 510.

At 510, process 500 may involve processor 412 of apparatus 410 (as a UE) receiving, via transceiver 416, from a network node (e.g., network node 130) a scheduling of a plurality of starting slots for an UL transmission by apparatus 410. Process 500 may proceed from 510 to 520.

At 520, process 500 may involve processor 412 performing, via transceiver 416, a listen-before-talk (LBT) procedure. Process 500 may proceed from 520 to 530.

At 530, process 500 may involve processor 412 performing, via transceiver 416, the UL transmission with an initial slot of the UL transmission in one of the plurality of starting slots based on a result of the LBT procedure.

In some implementations, in performing the UL transmission with the initial slot of the UL transmission in one of the plurality of starting slots based on the result of the LBT procedure, process 500 may involve processor 412 performing certain operations. For instance, process 500 may involve processor 412 selecting a first starting slot of the plurality of starting slots to begin the UL transmission responsive to the result of the LBT procedure indicating no other transmission in the first starting slot. Moreover, process 500 may involve processor 412 selecting a second starting slot of the plurality of starting slots after the first starting slot to begin the UL transmission responsive to the result of the LBT procedure indicating at least one other transmission in the first starting slot.

In some implementations, the at least one other transmission may include a PRACH transmission by another apparatus (e.g., apparatus 420).

In some implementations, in performing the UL transmission, process 500 may involve processor 412 performing the UL transmission with an initial slot of the UL transmission preceded by a preamble. In some implementations, the preamble may be cell-specific with respect to a cell with which apparatus 410 is associated. In some implementations, the preamble may be configured by RMSI or RRC signaling from the network node. In some implementations, the preamble may indicate a duration of the UL transmission. Alternatively, or additionally, the preamble may indicate an identification of a serving cell.

In some implementations, in performing the LBT procedure, process 500 may involve processor 412 performing certain operations. For instance, process 500 may involve processor 412 detecting an existence of any preamble before performing the UL transmission. Based on a result of the detecting, process 500 may involve processor 412 performing the LBT procedure before the UL transmission in response to a preamble transmitted by one other apparatus being detected. Alternatively, process 500 may involve processor 412 skipping the LBT procedure before the UL transmission in response to no preamble being detected. In some implementations, the UL transmission may include a PRACH transmission, a PUSCH transmission, a PUCCH transmission, or a sounding reference signal (SRS) transmission.

In some implementations, in performing the LBT procedure, process 500 may involve processor 412 performing the LBT procedure based on the preamble transmitted by one other apparatus being detected plus on one or more of: (a) the detected preamble belonging to a same serving cell with which the apparatus is associated; and (b) the UL transmission being within a duration of one other UL transmission by the other apparatus as indicated in the preamble. In some implementations, the UL transmission may include a PRACH transmission. In such cases, the other UL transmission may include a PUSCH transmission, a PUCCH transmission, or an SRS transmission.

In some implementations, in performing the UL transmission, process 500 may involve processor 412 performing a PUCCH transmission with OCC applied to a PUCCH format to support multiplexing. In some implementations, in performing the PUCCH transmission with the OCC applied to the PUCCH format to support multiplexing, process 500 may involve processor 412 performing the PUCCH transmission with the OCC applied to PUCCH format 2 or format 3 to support multiplexing by CDM. In some implementations, a length of the OCC may be 2 or 4.

Figure 6:
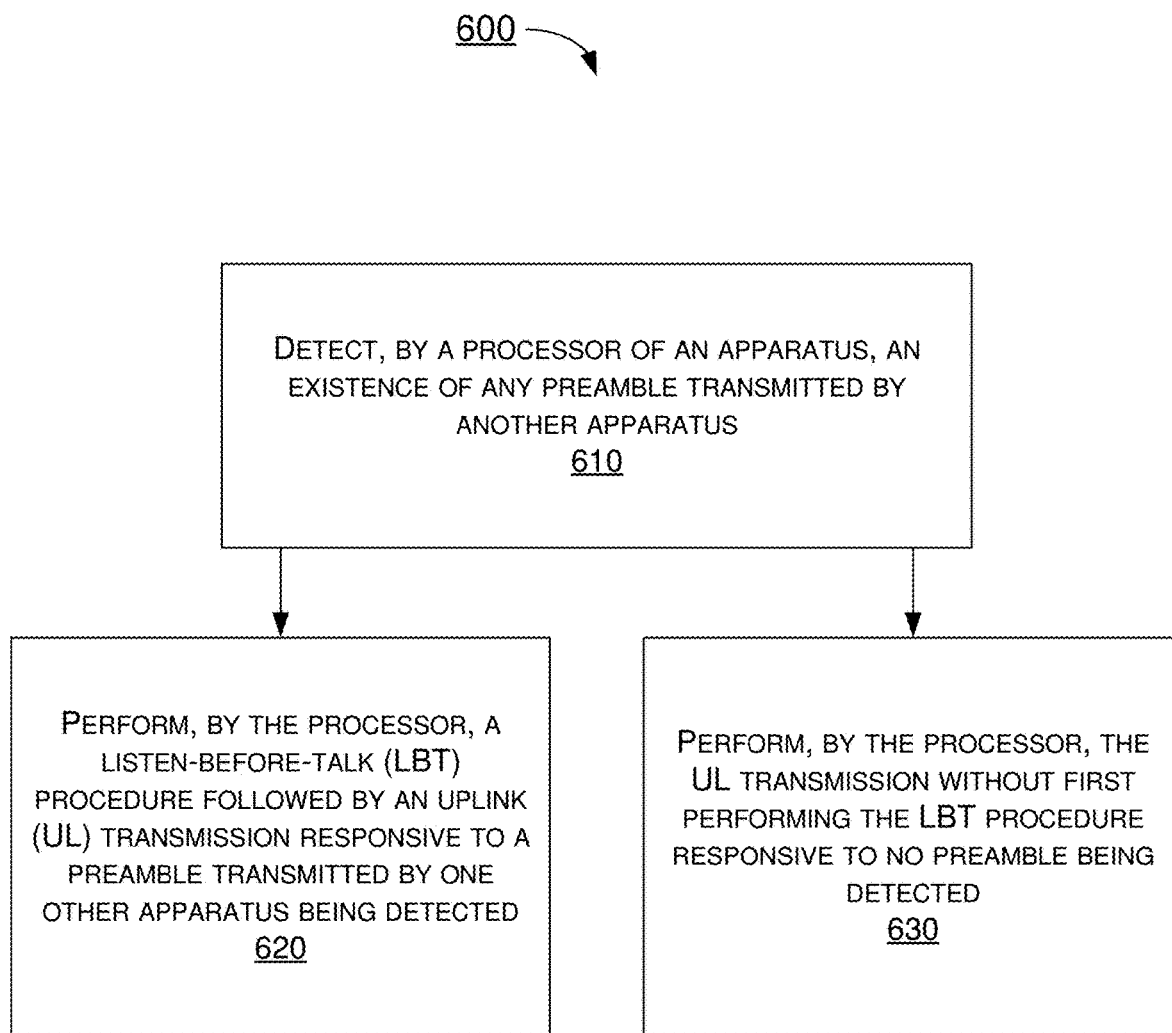
FIG. 6 is a flowchart of an example process in accordance with an implementation of the present disclosure.

FIG. 6 illustrates an example process 600 in accordance with an implementation of the present disclosure. Process 600 may be an example implementation of the proposed schemes described above with respect to UL designs for NR-U operation in mobile communications in accordance with the present disclosure. Process 600 may represent an aspect of implementation of features of apparatus 410 and apparatus 420. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may also be repeated partially or entirely. Process 600 may be implemented by apparatus 410, apparatus 420 and/or any suitable wireless communication device, UE, RUS, base station or machine type devices. Solely for illustrative purposes and without limitation, process 600 is described below in the context of apparatus 410 as one UE (e.g., first UE 110) and apparatus 420 as another UE (e.g., second UE 120) in a network environment (e.g., network environment 100). Process 600 may begin at block 610.

At 610, process 600 may involve processor 422 of apparatus 420 (as a UE) detecting, via transceiver 426, an existence of any preamble transmitted by another apparatus (e.g., apparatus 410). Based on a result of the detecting, process 600 may proceed from 610 to either 620 or 630.

At 620, process 600 may involve processor 422 performing, via transceiver 426, an LBT procedure followed by an UL transmission in response to a preamble transmitted by one other apparatus (e.g., apparatus 410) being detected.

At 630, process 600 may involve processor 422 performing, via transceiver 426, the UL transmission without first performing the LBT procedure in response to no preamble being detected.

In some implementations, the UL transmission may include a PRACH transmission. In such cases, the other UL transmission may include a PUSCH transmission, a PUCCH transmission, or an SRS transmission.

In some implementations, in performing the LBT procedure, process 600 may involve processor 422 performing the LBT procedure based on the preamble transmitted by one other apparatus being detected plus on one or more of: (a) the detected preamble belonging to a same serving cell with which the apparatus is associated; and (b) the UL transmission being within a duration of one other UL transmission by the other apparatus as indicated in the preamble. In such cases, the UL transmission may include a PRACH transmission, and the other UL transmission may include a PUSCH transmission, a PUCCH transmission, or an SRS transmission.

In some implementations, in performing the UL transmission, process 600 may involve processor 422 performing a PUCCH transmission with OCC applied to a PUCCH format to support multiplexing. In some implementations, in performing the PUCCH transmission with the OCC applied to the PUCCH format to support multiplexing, process 600 may involve processor 422 performing the PUCCH transmission with the OCC applied to PUCCH format 2 or format 3 to support multiplexing by CDM. In such cases, a length of the OCC may be 2 or 4.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, from a network node a scheduling of a plurality of starting slots for an uplink (UL) transmission by the apparatus;
performing, by the processor, a listen-before-talk (LBT) procedure; and
performing, by the processor, the UL transmission with an initial slot of the UL transmission in one of the plurality of starting slots based on a result of the LBT procedure,
wherein the performing of the UL transmission comprises performing a physical uplink control channel (PUCCH) transmission with orthogonal covering code (OCC) applied to a PUCCH format to support multiplexing, and
wherein the PUCCH transmission comprises transmission of a plurality of reference signal (RS) resource elements (REs) and a plurality of uplink control information (UCI) REs such that:
each RS RE of a first subset of the plurality of RS REs is transmitted between two respective UCI REs of the plurality of UCI REs, and
each UCI RE of a second subset of the plurality of UCI REs is transmitted between one respective RS RE of the plurality of RS REs and another UCI RE of the second subset,
wherein the performing of the PUCCH transmission with the OCC applied comprises applying OCCs comprising $\{1\ 1\ 1\ 1\ 1\ 1\ 1\ 1\}$, $\{1\ -j\ -1\ j\ 1\ -j\ -1\ j\}$, $\{1\ -1\ 1\ -1\ 1\ -1\ 1\ -1\}$, or $\{1\ j\ -1\ -j\ 1\ j\ -1\ -j\}$.

2. The method of claim 1, wherein the performing of the UL transmission with the initial slot of the UL transmission in one of the plurality of starting slots based on the result of the LBT procedure comprises:
selecting a first starting slot of the plurality of starting slots to begin the UL transmission responsive to the result of the LBT procedure indicating no other transmission in the first starting slot; and
selecting a second starting slot of the plurality of starting slots after the first starting slot to begin the UL transmission responsive to the result of the LBT procedure indicating at least one other transmission in the first starting slot.

3. The method of claim 2, wherein the at least one other transmission comprises a physical random access channel (PRACH) transmission by another apparatus.

4. The method of claim 1, wherein the preamble is cell-specific with respect to a cell with which the apparatus is associated.

5. The method of claim 1, wherein the preamble indicates a duration of the UL transmission.

6. The method of claim 5, wherein the preamble further indicates an identification of a serving cell.

7. The method of claim 1, wherein the performing of the LBT procedure comprises:
detecting an existence of any preamble before performing the UL transmission; and
performing the LBT procedure before the UL transmission responsive to one other preamble transmitted by one other apparatus being detected.

8. The method of claim 7, wherein the UL transmission comprises a physical random channel (PRACH) transmission, a physical uplink shared channel (PUSCH) transmission, a physical uplink control channel (PUCCH) transmission, or a sounding reference signal (SRS) transmission.

9. The method of claim 7, wherein the performing of the LBT procedure comprises performing the LBT procedure based on the other preamble transmitted by one other apparatus being detected plus on one or more of:
the other preamble belonging to a same serving cell with which the apparatus is associated; and
the UL transmission being within a duration of one other UL transmission by the other apparatus as indicated in the other preamble.

10. The method of claim 9, wherein the UL transmission comprises a physical random channel (PRACH) transmission, and wherein the other UL transmission comprises a physical uplink shared channel (PUSCH) transmission, a physical uplink control channel (PUCCH) transmission, or a sounding reference signal (SRS) transmission.

11. The method of claim 1, wherein the performing of the PUCCH transmission with the OCC applied to the PUCCH format to support multiplexing comprises performing the PUCCH transmission with the OCC applied to PUCCH format 2 or format 3 to support multiplexing by code-division multiplexing (CDM).

12. A method, comprising:
detecting, by a processor of an apparatus, an existence of any preamble transmitted by another apparatus; and
performing, by the processor, an uplink (UL) transmission without first performing a listen-before-talk (LBT) procedure responsive to no preamble being detected,
wherein the performing of the UL transmission comprises performing a physical uplink control channel (PUCCH) transmission with orthogonal covering code (OCC) applied to a PUCCH format to support multiplexing, and
wherein the PUCCH transmission comprises transmission of a plurality of reference signal (RS) resource elements (REs) and a plurality of uplink control information (UCI) REs such that:
each RS RE of a first subset of the plurality of RS REs is transmitted between two respective UCI REs of the plurality of UCI REs, and
each UCI RE of a second subset of the plurality of UCI REs is transmitted between one respective RS RE of the plurality of RS REs and another UCI RE of the second subset,
wherein the performing of the PUCCH transmission with the OCC applied comprises applying OCCs comprising $\{1\ 1\ 1\ 1\ 1\ 1\ 1\ 1\}$, $\{1\ -j\ -1\ j\ 1\ -j\ -1\ j\}$, $\{1\ -1\ 1\ -1\ 1\ -1\ 1\ -1\}$, or $\{1\ j\ -1\ -j\ 1\ j\ -1\ -j\}$.

13. The method of claim 12, wherein the UL transmission comprises a physical random channel (PRACH) transmission, a physical uplink shared channel (PUSCH) transmission, a physical uplink control channel (PUCCH) transmission, or a sounding reference signal (SRS) transmission.

14. The method of claim 12, further comprising:
performing, by the processor, the LBT procedure followed by the UL transmission responsive to one other preamble being transmitted by one other apparatus being detected,
wherein the performing of the LBT procedure comprises performing the LBT procedure based on the other preamble transmitted by one other apparatus being detected plus on one or more of:
the other preamble belonging to a same serving cell with which the apparatus is associated; and the UL transmission being within a duration of one other UL transmission by the other apparatus as indicated in the other preamble, wherein the UL transmission comprises a physical random channel (PRACH) transmission, and wherein the other UL transmission comprises a physical uplink shared channel (PUSCH) transmission, a physical uplink control channel (PUCCH) transmission, or a sounding reference signal (SRS) transmission.

15. The method of claim 12, wherein the performing of the PUCCH transmission with the OCC applied to the PUCCH format to support multiplexing comprises performing the PUCCH transmission with the OCC applied to PUCCH format 2 or format 3 to support multiplexing by code-division multiplexing (CDM).

* * * * *